United States Patent [19]
Unterforsthuber

[11] Patent Number: 5,842,751
[45] Date of Patent: Dec. 1, 1998

[54] BRAKE SYSTEM FOR MOTOR VEHICLES HAVING A BRAKE POWER ASSIST UNIT

[75] Inventor: Jakob Unterforsthuber, Maisach, Germany

[73] Assignee: Bayerische Motoren Werke AG, Germany

[21] Appl. No.: 682,377

[22] Filed: Jul. 17, 1996

[30] Foreign Application Priority Data

Jul. 17, 1995 [DE] Germany .................. 195 25 985.8

[51] Int. Cl.$^6$ ...................................... B60T 8/00
[52] U.S. Cl. .............................. 303/115.3; 303/113.4; 303/155
[58] Field of Search .............. 303/115.1, 115.3, 303/113.4, 114.1, 155, 113.3, 114.3; 601/547.1, 545, 551, 591, 548

[56] References Cited

U.S. PATENT DOCUMENTS

| | | | |
|---|---|---|---|
| 4,512,615 | 4/1985 | Kita et al. | 303/155 |
| 4,620,750 | 11/1986 | Leiber | 303/113.4 |

FOREIGN PATENT DOCUMENTS

| | | | |
|---|---|---|---|
| 0 379 329 A2 | 1/1990 | European Pat. Off. | |
| 3635393 | 4/1987 | Germany | 303/155 |
| 38 15 768 A1 | 11/1989 | Germany. | |
| 3939978 | 6/1991 | Germany | 303/113.4 |
| 40 00 324 A1 | 11/1991 | Germany. | |
| 42 17 409 A1 | 2/1993 | Germany. | |
| 42 28 277 A1 | 3/1994 | Germany. | |
| 43 32 838 C1 | 12/1994 | Germany. | |
| 43 40 921 A1 | 8/1995 | Germany. | |

*Primary Examiner*—Peter M. Poon
*Attorney, Agent, or Firm*—Evenson, McKeown, Edwards & Lenahan, P.L.L.C.

[57] ABSTRACT

A brake system for motor vehicles according to the invention has a brake power assist unit which generates an output brake power by superimposing an auxiliary power on a control power input by the brake pedal, and a hydraulic wheel brake regulating system which can generate a higher pressure in the wheel brake cylinder than the pressure set by the output brake power. An analysis device recognizes when the ratio of the auxiliary power to the control power falls below a predetermined value, after which a control device causes the hydraulic wheel brake regulating system to generate a desired pressure in the wheel brake cylinders which at least partially compensates the effect on the actual pressure due to the auxiliary power decreasing in relationship to the control power. The point at which the ratio of the auxiliary power to the control power falls below the predetermined value may be detected by a mechanical stop which interacts with an electric sensor device and/or by an electric signal which is emitted by a pressure sensor device when the auxiliary pressure is at least almost completely exhausted.

7 Claims, 3 Drawing Sheets

BRAKE SYSTEM FOR MOTOR VEHICLES HAVING A BRAKE POWER ASSIST UNIT

BACKGROUND AND SUMMARY OF THE INVENTION

This invention relates to a brake system having a brake power assist unit for a motor vehicle.

In a brake system for motor vehicles with a hydraulic wheel brake regulating system disclosed, for example, in German patent document DE 43 40 921 A1, a pressure can be generated in the wheel brake cylinders which is higher than the pressure set by the driver. The pressure controlled by the driver on the master brake cylinder is normally used to generate an output brake power of a brake power assist unit. This output brake power is the result of superimposing an auxiliary power generated by the brake power assist unit on the control power which is exercised by the driver on the brake pedal.

Brake power assist units are known whose auxiliary braking power becomes exhausted at a point which is determined by different operating parameters of the motor vehicle. For example, in the case of a vacuum brake power assist unit, the auxiliary power is exhausted at the so-called triggering point, which depends, for example, on the size of the power assist unit and the applied vacuum in the chamber of the brake power assist unit connected with the vacuum source. The vacuum source in Otto engines is, for example, the momentary vacuum in the intake system of the internal-combustion engine. This vacuum, in turn, is a function of the operating condition, control parameters, rotational speed, temperature, size of the cylinder units and efficiency of the internal-combustion engine. Thus, the triggering point, or the point at which the ratio of the auxiliary power to the control power falls below a predetermined value, cannot be clearly assigned to a fixed control power.

When the triggering point is reached, or when the ratio of the auxiliary power to the control power falls below a predetermined level, the output brake power of the brake power assist unit can be increased only (or to a much greater extent) by means of the driver's control power. This situation occurs, for example, when the vacuum and/or the coefficient of friction at the wheel brake is very low. For a very abrupt deceleration, therefore, the driver would have to increase the control power drastically in order to reach the desired deceleration. Moreover, in the future, an increased danger of a very low vacuum will exist because more stringent exhaust gas requirements for internal-combustion engines will adversely affect the generation of the vacuum. Although the brake power assist unit may be enlarged correspondingly as a countermeasure, even today the housing of the brake power assist units presents space problems. In addition, the larger the brake power assist unit, the more the operating characteristics deteriorate.

It is therefore an object of the present invention to provide an improved brake system of the initially mentioned type which achieves the desired deceleration for any operating condition of the motor vehicle, without need of a larger space for the brake power assist unit.

This object is achieved by the brake power assist unit according to the invention in which an analysis device detects when the ratio of the auxiliary power to the control power falls below a predetermined value. A control device then actuates the hydraulic wheel brake regulating system to generate a desired pressure in the wheel brake cylinders which at least partially compensates for the effect of the decrease of the auxiliary power relative to the control power.

The point at which the ratio of the auxiliary power to the control power falls below a predetermined value may, for example, be the triggering point as defined for vacuum brake power assist units, or an almost complete exhaustion of the auxiliary power of another type of brake power assist unit. In general, according to the invention, as the auxiliary power which would otherwise normally be expected by the driver decreases, the pressure in the wheel brake regulating system is increased, for example, by an otherwise existing hydraulic pump, corresponding to the reduction of the auxiliary power. Preferably, the pressure in the wheel brake cylinders is increased sufficiently to achieve the same braking effect which would occur (without need of any additional increase of the pressure), if the ratio of the auxiliary power to the control power were maintained.

Since hydraulic wheel brake regulating systems, particularly all-wheel Anti Skid Control (ASC) regulating systems, are known and are becoming more common, an improvement of the brake system for motor vehicles can be achieved without having to take space-consuming construction measures. Furthermore, the driver does not receive the impression, in any operational driving condition, that the brake control no longer has any effect.

In one embodiment of the invention, a mechanical stop interacts with an electric sensor device to detect a decrease of the ratio of the auxiliary power to the control power below a predetermined value. Preferably the mechanical stop activates a switch when the auxiliary power is exhausted. This is a particularly simple method of recognizing a decrease or exhaustion of auxiliary power.

Another advantageous embodiment of the invention relates to an auxiliary pressure (for example, excess pressure or vacuum) brake power assist unit.

The point at which the ratio of the auxiliary power to the control power falls below a predetermined value corresponds substantially to the triggering point of the auxiliary pressure brake power assist unit. Close proximity of the system to the triggering point is detected by an electric signal which is emitted by a pressure sensor device when the auxiliary pressure is almost completely exhausted. For example, the time when the system reaches the triggering point in the case of a vacuum brake power assist unit is detected by a pressure switch in the chamber which is acted upon with atmospheric pressure when the brake is controlled. The auxiliary pressure is exhausted when the vacuum in the chamber acted upon by atmospheric pressure during the controlling of the brake, reaches atmospheric pressure.

Alternatively, however, the point at which the system almost reaches the triggering point can be determined by a pressure sensor in the chamber acted upon by atmospheric pressure during the controlling of the brake, which pressure sensor continuously senses the course of the vacuum. Preferably, the electric signals of the sensor in the chamber are transmitted to the analysis device and the control device.

A pressure sensor or pressure switch of this type can also be used in the case of hydraulic and/or excess pressure brake power assist units. For this purpose, the pressure in the brake power assist unit is compared, for example, with the pressure in the pressure energy supply line (pressure differential switch).

In a further embodiment of the invention, a reduced or exhausted auxiliary power can be recognized without the need for structural changes of the brake power assist unit.

Other objects, advantages and novel features of the present invention will become apparent from the following detailed description of the invention when considered in conjunction with the accompanying drawings.

DETAILED DESCRIPTION OF THE DRAWINGS

Figure 1:
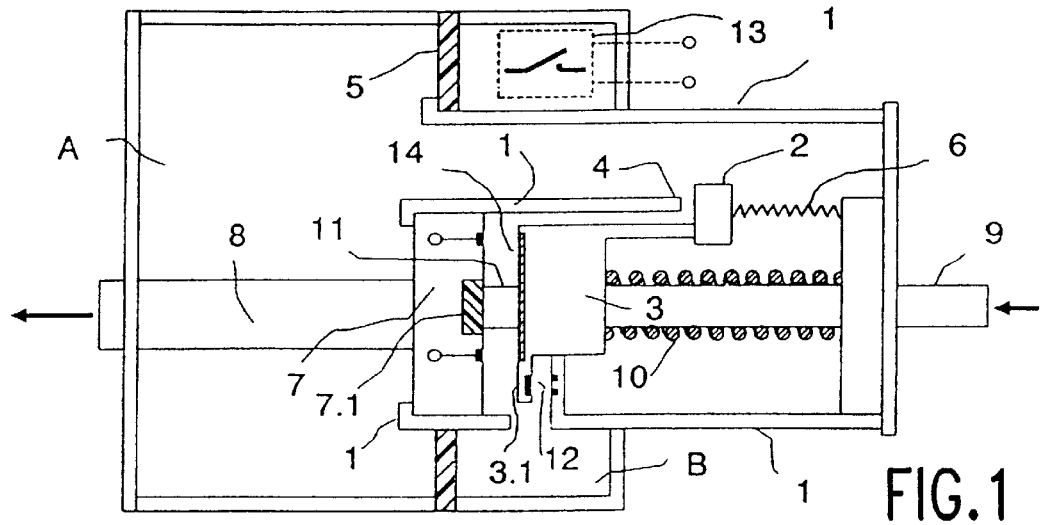
FIG. 1 is a view of the vacuum brake power assist unit according to the invention when the brake pedal is not actuated.
Figure 2:
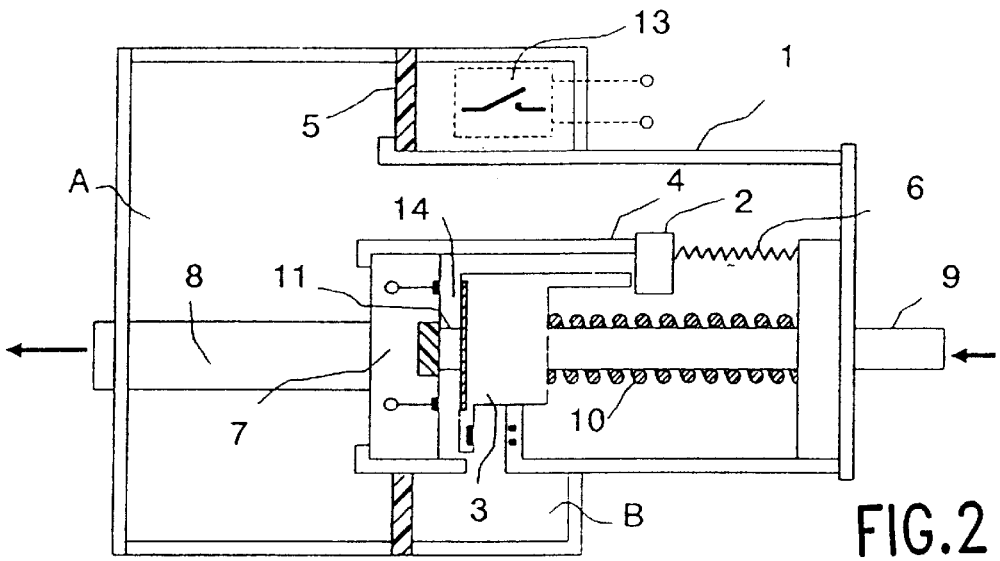
FIG. 2 is a view of the vacuum brake power assist unit when the brake pedal is slightly actuated.
Figure 3:
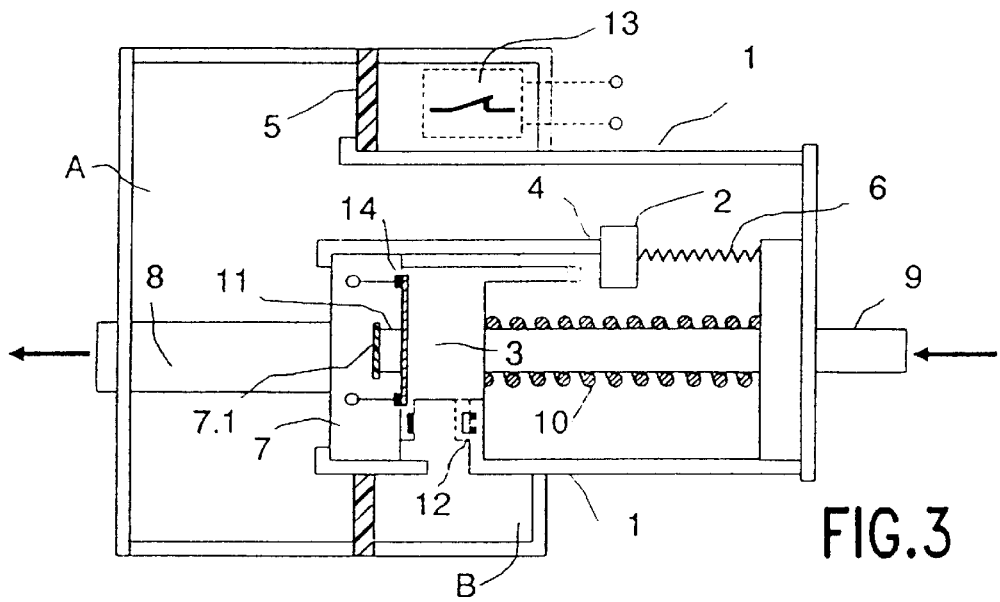
FIG. 3 is a view of the vacuum brake power assist unit at the triggering point.

FIGS. 1 to 3, in which identical parts have the same reference numbers, illustrate schematically a brake power assist unit in the form of a vacuum brake power assist unit.

In FIGS. 1 to 3, the brake power assist unit, designated generally by reference numeral 15, has two chambers A and B which are separated by an elastic membrane 5. Chamber A is connected with a vacuum source (not shown). A valve housing 1, fixedly connected with the membrane 5, controls the atmospheric air inlet into the chamber B when the brake is actuated.

A control rod 9 is operatively connected with the brake pedal. A control valve 2 is coupled with the control rod 9 by means of a spring 6. Furthermore, a valve piston 3 having a sensor piston 11 is coupled to the control rod 9 by means of a spring 10. The valve piston 3 or its lock 3.1 has an electrically conductive path which can interact with adjacent contacts on the surface of a reaction disk 7, to act as a switch. At least in area 7.1, the reaction disk 7 is elastic.

The reaction disk 7 is connected with a reaction piston 8 which presses on the master brake cylinder piston (not shown) when the brake pedal is actuated. The sensor piston 11 strikes against the reaction disk 7.

In FIG. 1, chambers A and B are connected by an opening between the control valve 2 and the sealing edge 4 of the valve housing 1. As a result, the same vacuum exists in both chambers A and B (chamber A being connected with a vacuum source, as noted previously). A sensor device 13 in the form of a pressure switch is arranged in the chamber B and is electrically connected with an analysis and control device (not shown). The pressure switch 13 is open until the vacuum is removed in chamber B and there is atmospheric pressure (compare FIG. 3). As long as no atmospheric pressure exists in the chamber B and/or as long as the switch 14 is opened, the triggering point has not been reached. However, in FIG. 2, the control valve 2 which now abuts the sealing edge of the valve piston 3, blocks the flow of the atmospheric pressure from the interior of the valve housing 1 (which has ducts —not shown—opening to the exterior), to the chamber B.

In FIG. 2, the brake pedal, and therefore the control rod 9, are slightly actuated in the direction of the arrow, so that the valve piston 3 with the adjoining control valve 2 moves to the sealing edge 4 on the valve housing 1. As a result, the previously existing opening between the control valve 2 and the sealing edge 4 is closed, and therefore the connection between the two chambers A and B is interrupted. The switches 13 and/or 14 both remain open.

Figure 4:
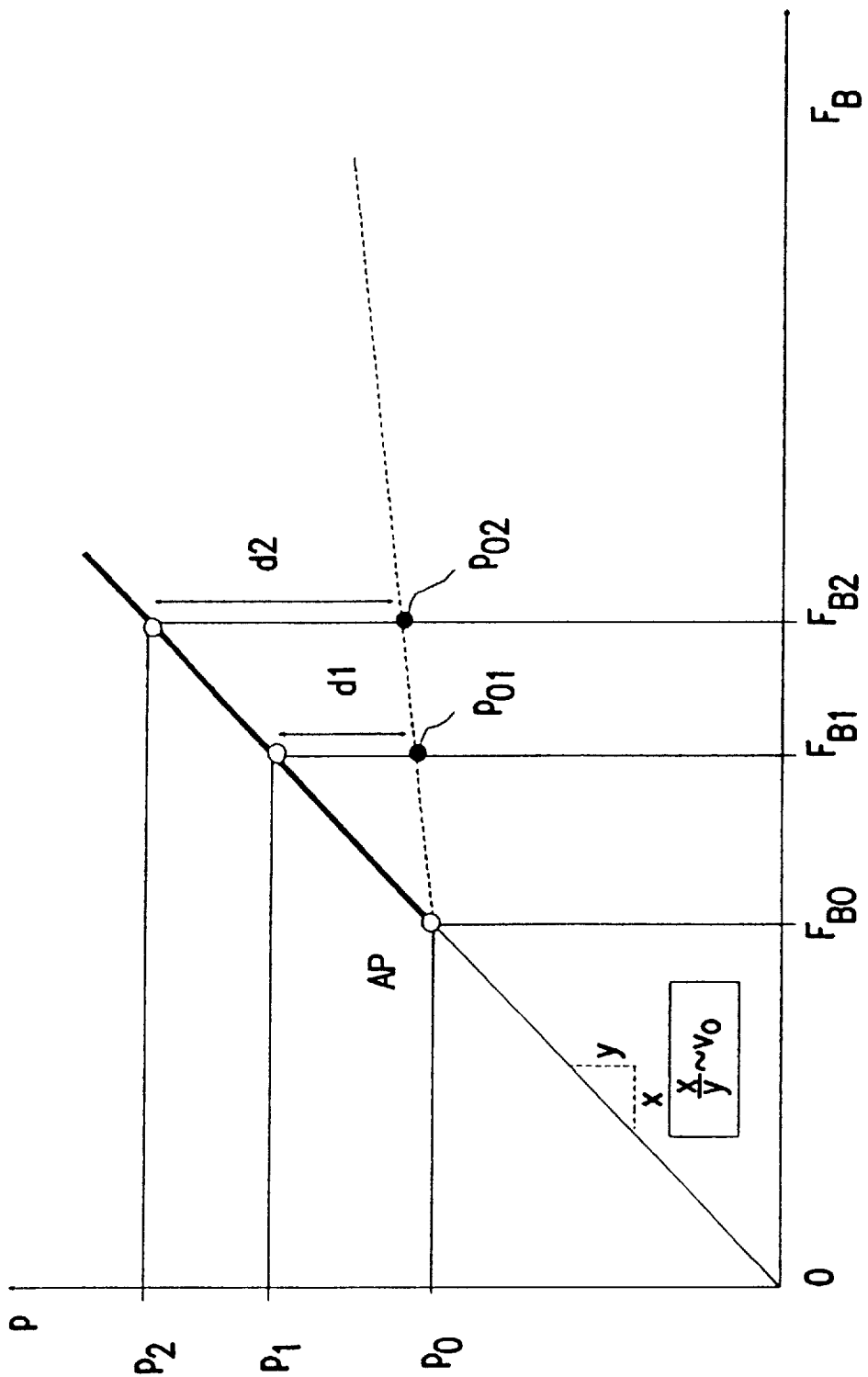
FIG. 4 is a view of a pressure rise according to the invention after the triggering point is reached.

According to FIG. 3, when the control rod 9 is further actuated, the valve piston 3 lifts off further from the control valve 2 (compare interrupted line of the valve piston 3). Atmospheric air pressure flows through the ducts in the valve housing 1 to the chamber B, while the chamber A is continuously connected to the vacuum source. The atmospheric pressure in chamber B acts on the membrane 5, and because the latter is fixedly connected with the valve housing 1, the valve housing 1 is taken along. In this manner, an auxiliary power provided by the vacuum in chamber A is superimposed on the control power $F_B$ (FIG. 4) exerted by the control rod 9 on the reaction disk 7, so that the output brake power of the brake power assist unit (indicated by the left arrow) is obtained. The power flux takes place by way of the valve housing 1, the reaction disk 7 and the reaction piston 8. Until the triggering point (AP) is reached, the auxiliary power and the control have a predetermined ratio $v_O$ according to the internal power assistance ratio (FIG. 4).

A continuous increase of the control power $F_B$ results in a continuous reduction of the vacuum in the chamber B. As a function of the momentary vacuum existing in the chamber A, the triggering point AP is reached at a specific control power $F_{BO}$ (FIG. 4). The output brake power of the brake power assist unit can now take place only by increasing the control power without any superimposing of auxiliary power.

Since full atmospheric pressure exists in the chamber B at the triggering point, the pressure switch 13 is closed in FIG. 3. In addition, the switch 14 is closed by the mechanical stop of the valve piston 3 or of the lock 3.1 on the reaction disk 7. At the triggering point, because the vacuum in chamber A becomes exhausted, the elastic area 7.1 of the reaction disk 7 is pressed in by the sensor piston 11 so that the lock 3.1 of the valve piston 3, which has the conductive contact path, is placed against the adjacent contact points on the valve housing 1 (not shown) or to the reaction disk 7. This position corresponds to the mechanical stop which is assigned to the triggering point AP or to the point at which the ratio of the auxiliary power to the control power falls below a predetermined value.

As a result, the switch 14, which is also connected with the analysis and control device, is closed. The switches 13 and 14 may be used alternatively or in combination with one another to detect the point at which auxiliary braking power is exhausted.

In a further embodiment, for example, when the switch 14 is used for a regulated or controlled pressure reduction, another switch 12 (FIG. 3) is provided, which is closed when the control power $F_B$ onto the control rod 9 is reduced. This "release position" is also defined by a mechanical stop which closes the switch 12 in this case.

FIG. 4 shows the regulation according to the invention after the triggering point AP has been reached and recognized, which is used here as an example of a situation in which the ratio of the auxiliary power to the control power falls below a predetermined value. In FIG. 4, the control power $F_B$ is entered on the abscissa and the actual pressure p, with respect to at least one wheel brake cylinder, is entered on the ordinate. (The pressure in the wheel brake cylinders is basically equivalent to the pressure in the main supply lines of the hydraulic wheel brake regulating system.)

From the initial "release position"0, the control power is increased to a value $F_{BO}$. At this point, the actual pressure p in the wheel brake cylinder ($p_0$) is equal to the desired pressure indicated by the driver in the form of the control force $F_B$. A characteristic curve stored in the analysis and control device assigns to each value of the control force $F_B$ a desired pressure p in the wheel brake cylinders or in the main supply line of the hydraulic wheel brake regulating system. This characteristic curve corresponds to the predetermined ratio $v_0$ of the auxiliary power to the control power $F_B$. In the illustrated example according to FIG. 4, this characteristic curve is a straight line, with a slope y/x proportional to the predetermined ratio $v_0$ of the auxiliary power to the control power $F_B$. Until the triggering point AP is reached, this ratio $v_0$ is the result of the structure of the brake power assist unit by itself. However, the triggering point is a function of the strength of the vacuum which exists in the chamber A.

When the triggering point AP is reached, the ratio falls below the predetermined value $v_0$, because the auxiliary power is almost completely exhausted. Thereafter, increased pressure p in the wheel brake cylinder is possible only by increasing the control power $F_B$ (compare interrupted line). Until the triggering point AP (or the actual pressure $p_0$ is reached which, up to the triggering point AP, is equal to the desired pressure in the wheel brake cylinders), no additional pressure increase takes place to assist the control power by means of the hydraulic brake regulating system.

By means of the analysis device, the control power $F_B$ is detected as an indication of the driver's desire. (As noted previously, the corresponding desired pressure p may be determined by means of a look up table.) If, for example, a control power $F_{B1}$ (greater than $F_{B0}$) is detected the desired pressure $p_1$ is assigned to this control power $F_{B1}$, as shown by the characteristic curve in FIG. 4. According to the invention, the hydraulic brake regulating system will then generate this desired pressure $p_1$ by increasing the pressure p by the difference d1 between the pressure $p_{01}$ resulting from the output brake force of the brake force assist unit and the desired pressure $p_1$. (As noted previously, such additional pressure d may be provided by means of an alternative pressure source, such as a hydraulic pump which is otherwise already present in the vehicle. See FIG. 5, The same approach is taken when a control power $F_{B2}$ is recognized. That is, the output brake power of the brake power assist unit in the case of a control power $F_{B2}$, without any pressure increase by the hydraulic wheel brake regulating system, includes only an actual pressure $p_{02}$. By extrapolation of the characteristic curve through the triggering point AP, however, a desired pressure $p_2$ is assigned to the control power $F_{B2}$. The hydraulic wheel brake regulating system according to the invention will then, in turn, generate the desired pressure $p_2$ by providing the additional pressure d2 between the calculated actual pressure $p_{02}$ and the desired pressure $p_2$.

The rise of the interrupted-line course of the actual value p, which would occur as a function of the control power $F_B$ without any pressure increase by the hydraulic wheel brake regulating system, is known. According to the invention, the start of the interrupted characteristic curve is in each instance placed at the control power $F_B$ at which the triggering point AP has been reached. For this purpose several possible combinations of sensors can be used to recognize the triggering point and the driver's desire: for example, only the switch 14 and the switch 12 may be used. An analysis or control device (control unit) is not absolutely necessary because the switches 14 and 12 can directly control the hydraulic unit of the brake pressure regulating system for increasing the pressure. Alternatively, only the switch 13, a pedal power sensor for determining the control power $F_B$ and an analysis or control device (control unit) may be provided. In this case, when the triggering point AP is reached, the hydraulic unit is controlled for a predetermined time period as a function of the increase of the control power $F_B$.

Figure 5:
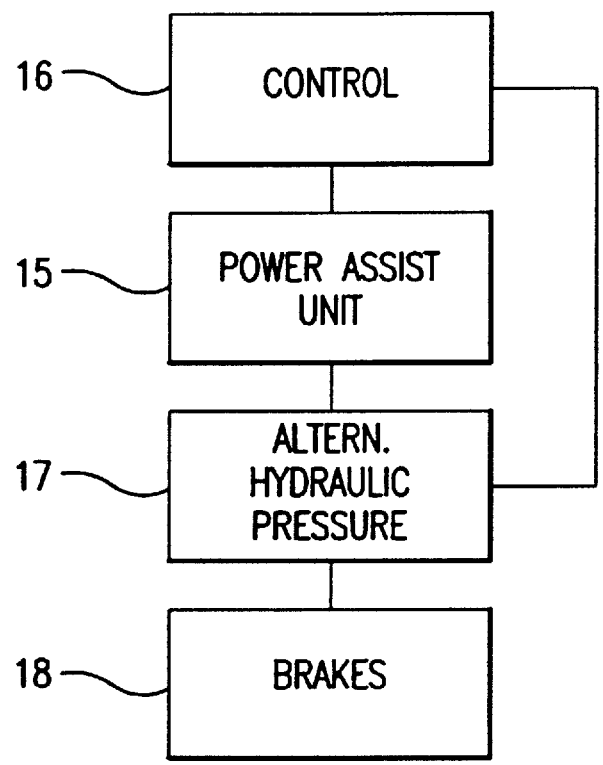
FIG. 5 shows an embodiment of the invention which includes a control unit for regulating the provision of additional hydraulic pressure from an alternate pressure source.

FIG. 5 illustrates an example of an embodiment of the invention which includes a control unit 15, which may have stored therein a look up table or characteristic curve which associates a desired pressure p with each value of control power $F_B$, such as indicated in FIG. 4. (It is of course apparent that functional relationships between $F_B$ and p other than the straight line shown in FIG. 4 may be provided.) As noted previously, a sensor in the power assist unit 15 (FIGS. 1–3) generates a signal which indicates when the latter has reached the triggering point, or the point at which the auxiliary power is exhausted, and also provides a signal indicative of the control power $F_B$ input by the vehicle operator. The control unit then uses the value of $F_B$ to access the look up table and determine the amount of pressure difference d which is necessary to make up the difference between the actual pressure (e.g.. $p_{01}$) and the desired pressure (e.g., $p_1$), and causes the alternative hydraulic pressure source 17 to supply that amount of additional pressure (e.g. $d_1$) to the power assist unit 15. Thus, delivery of the desired pressure ($p_1$) to the brakes 18 is assured.

Instead of the pedal power sensor, a line pressure sensor may be provided on the master cylinder. The driver's desire is in each case obtained from the difference d (d1; d2).

Also, as described with respect to FIG. 4, a line pressure sensor may be provided on the wheel for determining the actual pressure p. Starting from the triggering point AP, the pressure p is controlled or regulated to increase to the desired pressure $p_1$ or $p_2$ when the actual pressure which is determined, for example, by a line pressure sensor on the master brake cylinder, amounts to $p_{01}$ or $p_{02}$.

A pedal power sensor for determining the control power $F_{B1}$ and $F_{B2}$ may also be combined with a line pressure sensor on the master brake cylinder to determine the actual pressure $p_{01}$ and $p_{02}$. According to the invention, the pressure is increased when the control power $F_{B1}$ does not generate the predetermined desired pressure $p_1$ but only the actual pressure $p_{01}$. In this case, the pressure increase takes place by means of a control.

However, instead of a control, regulation may take place as a function of the actual pressure p determined at the wheel by means of a line pressure sensor.

Preferably, the sensors which are present in an existing wheel brake regulating system are used.

The reduction of the increased brake pressure takes place, for example, as a function of the position of the switch 12 in each case in the reverse sequence.

In a supplementary manner, it is pointed out that, according to the invention, the switches 12 and 14 assigned to a mechanical stop can be used in any brake power assist unit. The switch 13 assigned to a specific pressure may be provided in any brake power assist unit whose auxiliary power is generated by means of pressure (for example, excess pressure) or differential pressure.

By means of this embodiment according to the invention, an optimal deceleration is achieved corresponding to the driver's braking desire.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A Brake system for motor vehicles having a vacuum actuated brake power assist unit which generates an output brake power by superimposing an auxiliary power on an input control power, and having a hydraulic wheel brake regulating system by means of which a hydraulic pressure can be generated in the wheel brake cylinders which is higher than a pressure set by the output brake power from the brake power assist unit, said brake system comprising:

an analysis device which determines when a ratio of the auxiliary power to the control power falls below a predetermined value, and generates a signal indicative thereof; and a control device which, in response to a signal from said analysis device, activates the hydraulic wheel brake regulating system to generate a desired pressure in the wheel brake cylinders which at least partially compensates an effect on the output brake power due to the auxiliary power decreasing in relationship to the control power.

2. The brake system according to claim 1, wherein a mechanical stop of the vacuum actuated brake power assist unit interacts with an electric sensor device to detect the falling of the ratio of the auxiliary power to the control power below said predetermined value.

3. The brake system according to claim 1, wherein:

the vacuum actuated brake power assist unit is an auxiliary pressure brake power assist unit;

the falling of the ratio of the auxiliary power to the control power below a predetermined value corresponds to almost complete reaching of a triggering point of the auxiliary pressure brake power assist unit; and the almost complete reaching of the triggering point is detected by an electric signal which is emitted by a pressure sensor device when the auxiliary pressure is almost completely exhausted.

4. A braking system for a motor vehicle comprising:

a vacuum actuated brake pressure assist unit which generates an output brake power by superimposing an auxiliary power on an input control power exerted by a vehicle operator via a brake pedal;

an alternative source of hydraulic pressure;

an analysis device for detecting exhaustion of auxiliary power in said brake pressure assist unit and for generating a signal indicative thereof; and a control unit for actuating said alternative source of hydraulic pressure, in response to a signal from said analysis device, to supply hydraulic pressure to said brake power assist unit so that a total hydraulic pressure output by said brake system approximates a desired pressure value corresponding to said input control power exerted by the vehicle operator.

5. The brake system according to claim 4, wherein said alternative source hydraulic pressure comprises a hydraulic pump which is part of a system other than said brake system, which is otherwise present on said vehicle.

6. The brake system according to claim 5, wherein said alternative source of hydraulic pressure comprises a hydraulic pump of a wheel brake regulating system.

7. The brake system according to claim 5, wherein said control unit has stored therein a characteristic which establishes a relationship between said input control power and said desired pressure value.

* * * * *